United States Patent [19]

Peters et al.

[11] 4,381,997

[45] May 3, 1983

[54] DIFFERENTIAL PRESSURE VALVE FOR A FUEL INJECTION SYSTEM

[75] Inventors: Klaus-Jürgen Peters, Affalterbach; Peter Stiefel, Ditzingen; Heinz Ehrentraut, Stuttgart, all of Fed. Rep. of Germany

[73] Assignee: Robert Bosch GmbH, Stuttgart, Fed. Rep. of Germany

[21] Appl. No.: 320,374

[22] Filed: Nov. 12, 1981

Related U.S. Application Data

[62] Division of Ser. No. 123,534, Feb. 22, 1980.

[30] Foreign Application Priority Data

Mar. 20, 1979 [DE] Fed. Rep. of Germany ....... 2910846

[51] Int. Cl.$^3$ .......... B01D 35/02

[52] U.S. Cl. .......... 210/352; 210/430; 210/485

[58] Field of Search .......... 210/352, 354, 390, 416.4, 210/429, 430, 431, 450, 451, 474, 478, 480, 484, 485

[56] References Cited

U.S. PATENT DOCUMENTS 1,581,947 4/1926 Hobbs .......... 210/485 X
1,987,854 1/1935 Humphrey .......... 210/429
3,409,135 11/1968 Bradley et al. .......... 210/416.4
3,447,687 6/1969 Canterbury .......... 210/451 X
4,082,676 4/1978 Dulger .......... 210/451 X

*Primary Examiner*—John Adee
*Attorney, Agent, or Firm*—Edwin E. Greigg

[57] ABSTRACT

A differential pressure valve is proposed for a fuel injection system of an internal combustion engine. The differential pressure valve includes a diaphragm embodied as the movable valve element, which separates two chambers from one another. A fuel supply line discharges into one chamber and a valve seat carrier provided with a valve opening protrudes into this chamber. This chamber also houses a filter element and a valve spring is disposed coaxially with the valve seat carrier between upper and lower spring plates. The filter element is disposed such that a subsequent change in the tension of the valve spring is also possible. To this end, the filter element can engage the upper spring plate on one side in a sealing manner and on the other side can be supported in a sealing manner in a groove of the wall of the chamber (FIG. 1). In order to assure the free mobility of the filter element, it is provided with an elastically deformable area. As shown in FIG. 2, the filter element may, however, also engage the lower spring plate in a sealing manner and with its other end surroundingly engage the spring plate with as little play as possible, to thereby form a labyrinth seal.

3 Claims, 3 Drawing Figures

DIFFERENTIAL PRESSURE VALVE FOR A FUEL INJECTION SYSTEM

This is a division, of application Ser. No. 123,534, filed Feb. 22, 1980.

BACKGROUND OF THE INVENTION

The invention relates to a differential pressure valve for a fuel injection system. A differential pressure valve is already known in which the filter element is disposed in such a manner that an adjustment of the spring plate on the valve seat carrier for the purpose of changing the tension of the valve spring is not possible.

OBJECT AND SUMMARY OF THE INVENTION

The differential pressure valve in accordance with the invention for a fuel injection system has the advantage over the prior art in that despite the disposition of a filter element between the fuel supply line and the valve opening, the spring plate supported on the valve seat carrier is displaceable, and the spring force of the valve spring thus can be changed. As a result it is assured that even with a differential pressure valve which is adjustable in this manner, the entry of small dirt particles into the gap between the diaphragm and the valve opening is avoided, thereby preventing a resultant malfunction on the part of the differential pressure valve.

As a result of the characteristics disclosed in the dependent claims, advantageous further embodiments of and improvements to the differential pressure valve disclosed are possible. It is particularly advantageous to support the end of the filter element remote from the end which engages the spring plate on the wall of the chamber of the differential pressure valve in such a manner as to provide a seal, and to further adapt the filter element to include at least one elastically deformable area, for instance, in the form of a folding diaphragm, which rolls down when movement occurs.

It is also advantageous to secure one end of the filter element in a sealing manner on the spring plate contacting the diaphragm and to have the other end of the filter element surroundingly engage the spring plate supported on the valve seat carrier with as little play as possible, the play acting as a labyrinth sealing means. As a result, free mobility of the spring plate supported on the valve seat carrier is assured.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
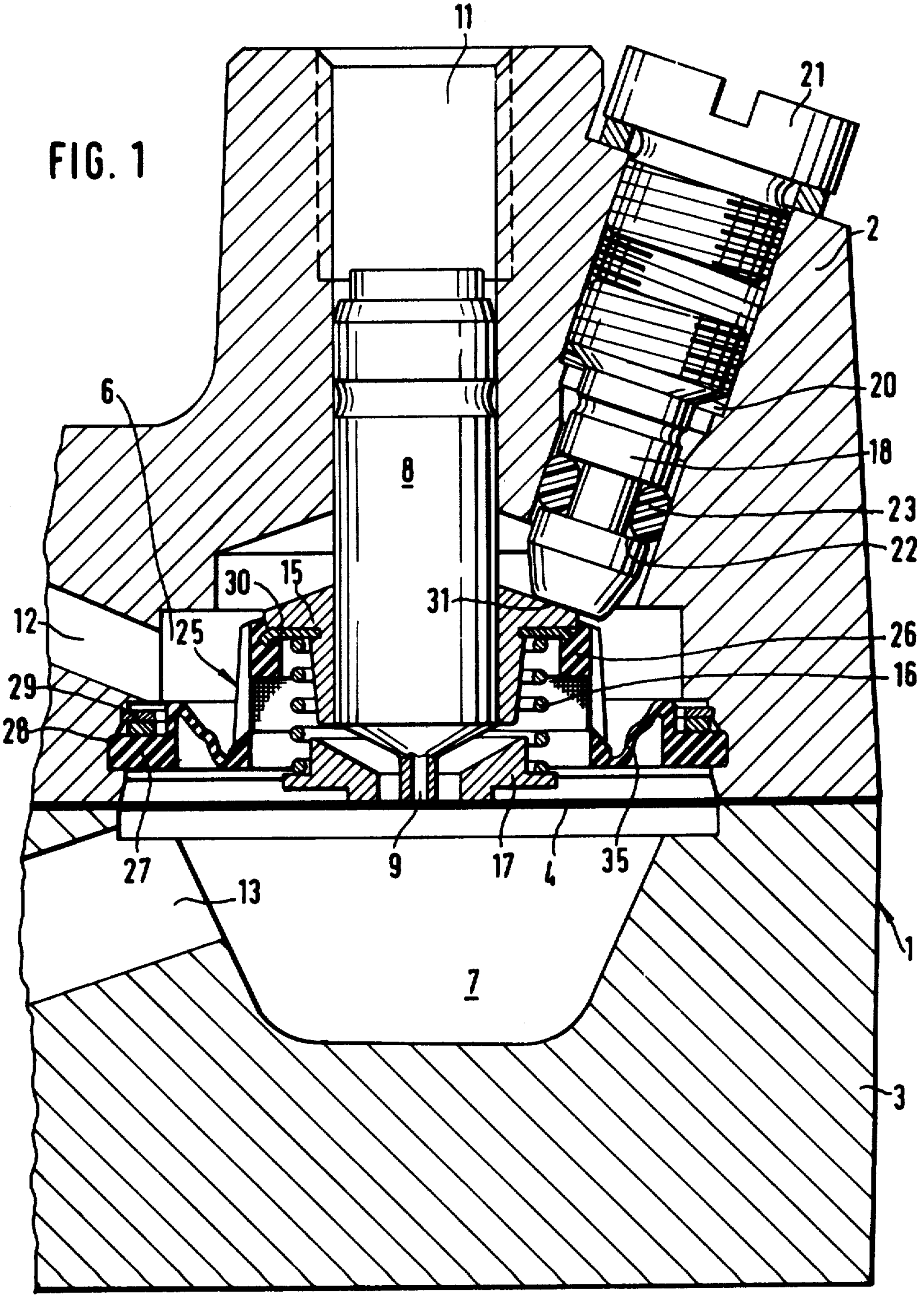
FIG. 1 shows a schematic cross-sectional view of a first exemplary embodiment of a differential pressure valve.

Turning now to the drawings, the differential pressure valve 1 shown in FIG. 1 is, by way of example, part of a fuel metering and distribution valve in a fuel injection system in accordance with German Offenlegungsschrift No. 26 48 956 for a mixture-compressing internal combustion engine with externally supplied ignition, and more particularly, an engine adapted for continuous injection. A diaphragm 4 is tensioned between an upper housing 2 and a lower housing 3, and therefore arranged to separate a chamber 6 provided in the upper housing 2 from a chamber 7 provided in the lower housing 3 and thus arranged to act as the movable valve element of the differential pressure valve 1. A valve seat carrier 8 protrudes into the chamber 6 of the differential pressure valve 1 and has a valve opening 9 on its terminal end which is oriented toward the diaphragm 4. Thus, fuel can proceed out of the chamber 6, when the diaphragm 4 is deflected away from the valve seat carrier 8, into a fuel injection line 11 and from there to fuel injection valves, which are not shown. The chamber 6 of the differential pressure valve 1 communicates with a fuel supply line 12 downstream of a fuel metering valve (not shown).

Fuel also flows into the chamber 7 in the lower housing 3 via a line 13, the pressure of which is constant or else is variable in a known (but not illustrated) manner in accordance with operating parameters of the engine.

A spring loaded plate 15 supported displaceably on the valve seat carrier 8 is disposed in the chamber 6 coaxially with the valve seat carrier 8. Supported on the spring loaded plate 15 is a valve spring element 16 which is coaxial with the valve seat carrier 8 and the lower portion of this spring is adapted to engage a plate 17, which is supported on the diaphragm 4. The spring loaded plate 15, with its conically shaped end remote from the valve spring 16, contacts an adjusting screw 18, which is rotatably supported in a threaded bore 20 provided in the upper housing 2. The threaded bore 20 can be closed off from the outside by means of a sealed locking screw 21. It may be particularly efficient from the standpoint of space for the threaded bore 20 and thus the adjusting screw 18 as well to be tilted relative to the axis of the valve seat carrier. In place of the adjusting screw 18, a pin rigidly guided in a bore could act as the adjustment means for the spring loaded plate 15. For the purpose of sealing and securing the adjusting screw 18 against twisting, a sealing ring 23 can be disposed in a groove 22 of the adjusting screw 18, which prevents the flow of fuel from the chamber 6 past the adjusting screw 18 and to the outside. By means of rotating the adjusting screw 18, the axial position of the spring loaded plate 15 with respect to the valve seat carrier 8 and thus the tension of the valve spring 16 can be varied. The spring force of the valve spring 16 determines the fuel pressure differential between the chambers 6 and 7 at which the diaphragm 4 lifts from the valve seat carrier 8 and the valve opening 9 opens in order to permit fuel flow from chamber 6 through opening 9 in valve seat carrier 8 into a fuel injection line 11.

There is now the danger that upstream of the chamber 6 of the differential pressure valve 1, dirt particles such as shavings, products of corrosion, particles from galvanized surfaces and the like may work loose and become caught in the narrow gap between the diaphragm 4 and the valve seat carrier 8, so that the proper functioning of the differential pressure valve 1 is interrupted or entirely prevented. In order to prevent such particles from reaching the valve opening 9, a filter element 25 is disposed in the chamber 6 between the fuel supply line 12 and the valve opening 9 and arranged to have one end 26 engage the spring plate 15, for example, and with its other end 27 being supported in a sealing manner in a groove 28 provided in the wall of the chamber 6. The ends 26 and 27 of the filter element 25 may be made of plastic or of a suitable rubber product. A spring ring 29 is also disposed in the groove 28 in such a manner that it presses the end 27 of the filter element 25 in the axial direction of the valve against the wall of the groove 28 and thus assures not only holding, but also sealing. Connected with the upper end 26 of the filter element 25 is a disc 30, which is arranged to rest against the lower surface of the spring loaded plate 15 and is held in the position shown in FIG. 1 by means of the spring 16 that is disposed between plates 17 and 15, respectively. As is also shown in FIG. 2 on a larger scale, the filter element 25 has at least one filter area 33 between the ends 26 and 27 which is made up of one or more layers of filtering screen and/or some other suitable filtering material.

Figure 2:
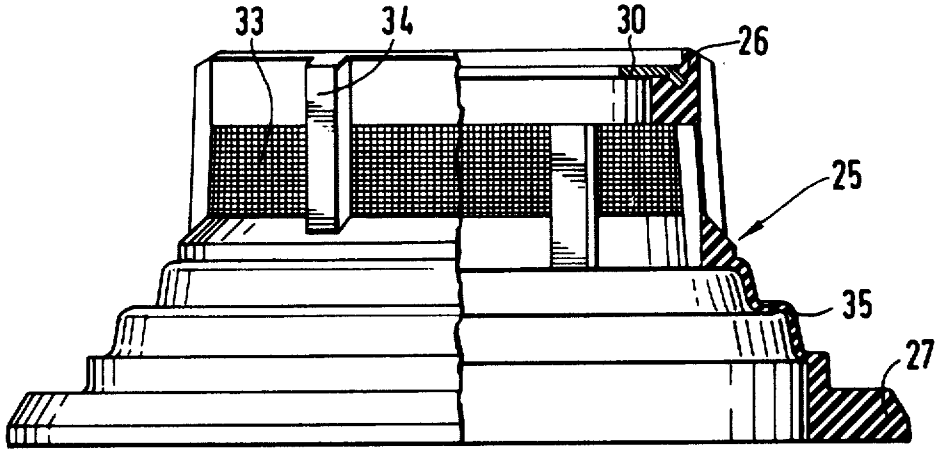
FIG. 2 shows a detailed elevational and cross-sectional view of a filter element as it is used in the exemplary embodiment of FIG. 1.

With further reference to FIG. 2, in order to assure the rigidity of the filter area 33, this area is provided with overlapping ribs 34. The filter element 25 furthermore has at least one elastically deformable area 35, which in the illustrated exemplary embodiment begins immediately adjacent to the filter area 33 and extends in an undulatory fashion toward the end 27. The elastically deformable area 35 may be embodied in the form of a flexible walled diaphragm and to thereby permit an axial movement of the ends 26 and 27 toward or away from one another, without restricting the filtering effect of the filter element 25. As a result of the disposition in accordance with the invention of the filter element 25 between the spring loaded plate 15 and the wall of the chamber 6, it is assured that even when the differential pressure valve 1 (see FIG. 1) has already been mounted, a change can be made in the tension of the valve spring 16, despite the filter element 25 being disposed between the fuel supply line 12 and the valve opening 9.

The filter element 25 could also engage the spring loaded plate 17 with its end 26; however, then the end 27 would have to be supported, in the direction toward the spring plate 15, in a sealing manner above the fuel supply line 12 on the wall of the chamber 6.

Figure 3:
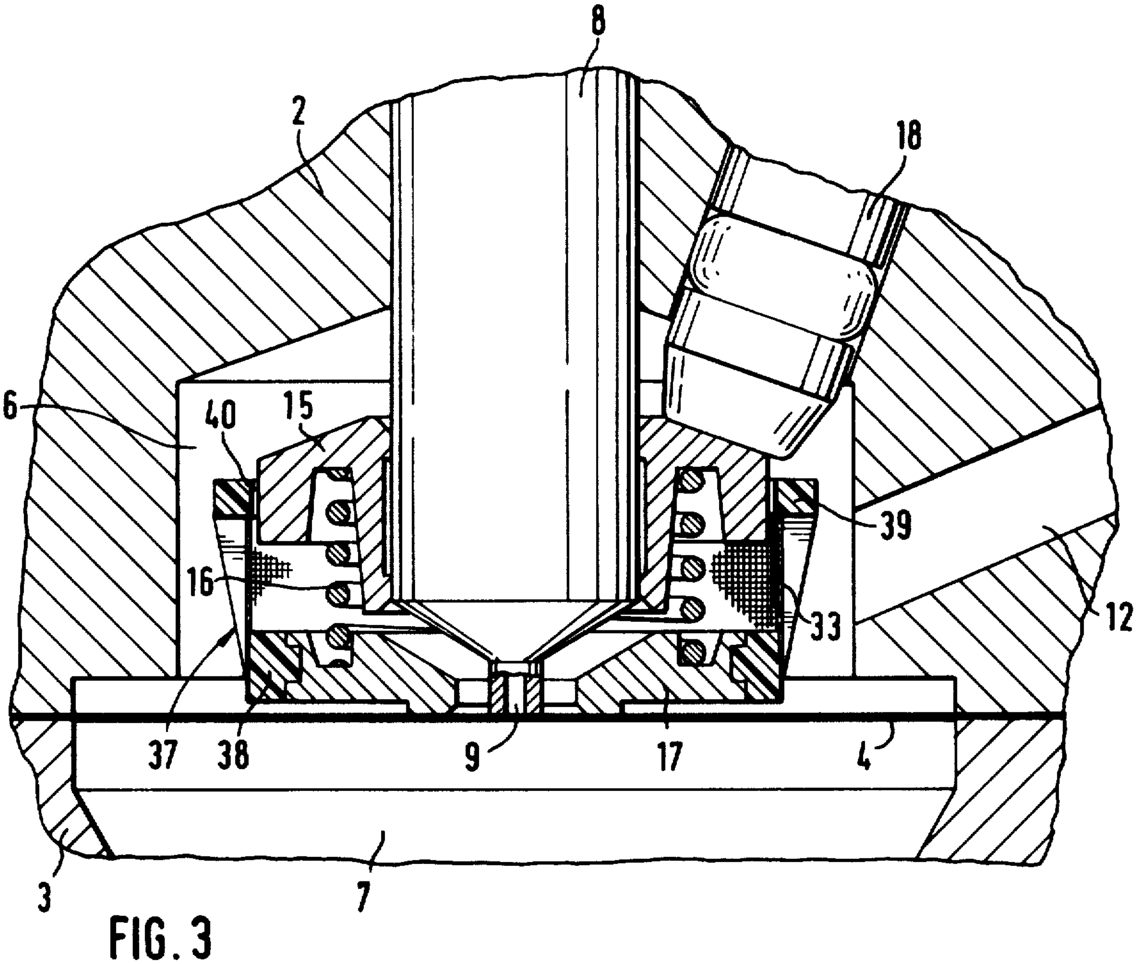
FIG. 3 shows a further schematic cross-sectional view of a second exemplary embodiment of a differential pressure valve.

In the second exemplary embodiment shown in FIG. 3, the elements which remain identical to those of the first exemplary embodiment are provided with the same reference numerals. Here, one end 38 of a filter element 37 is preferably associated with the spring loaded plate 17 in a sealing manner and the filter element 33 extends in an axial direction up to the other plate 15 as shown. The upper portion of the filter element is provided with an annulus 39 of plastic or rubber, as explained earlier herein, with the inner wall of the annulus so designed as to offer any resistance to fluid flow between the inner wall 40 and the confronting dependent wall of spring loaded plate 15. In other words, a contact-free actuation of the spring loaded plate 15 is possible relative to the filter element 37, while the play provided for between the inner wall of annulus 39 simultaneously acts as a labyrinth seal for the dirt particles. The illustrated disposition of the filter element 37 between the spring loaded plates 15 and 17 offers the additional advantage that dirt particles predominantly move into the vicinity of the diaphragm 4, so that it is practically impossible for even a small portion of the dirt particles enter the vicinity of the critical area.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A filter assembly for use in a diaphragm valve comprising an annular filter element having a circumference an upper and lower extremities, an annular resilient member encircling said upper extremity of said filter element, an annular resilient member associated with said lower extremity of said filter element, an annular spring loaded plate having a spring means extending within the annulus of said filter element and associated with said lower annular resilient member and resilient rib-like means arranged in spaced relation about the circumference of said filter element to reinforce the same, said rib-like means being connected to each annuli of said filter element.

2. A filter assembly as claimed in claim 1, further wherein said annular resilient member associated with said lower extremity of said filter element further includes a flexible diaphragm.

3. A filter assembly as claimed in claim 1, further wherein said upper annular resilient member encompasses a further spring-loaded plate and thereby forms a labyrinth seal therewith.

* * * * *